(12) United States Patent
Kudo et al.

(10) Patent No.: US 12,458,305 B2
(45) Date of Patent: Nov. 4, 2025

(54) X-RAY EQUIPMENT

(71) Applicant: FUJIFILM Healthcare Corporation, Kashiwa (JP)

(72) Inventors: Masatoshi Kudo, Kashiwa (JP); Yuko Aoki, Kashiwa (JP); Shigeharu Hirose, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 252 days.

(21) Appl. No.: 18/139,614

(22) Filed: Apr. 26, 2023

(65) Prior Publication Data
US 2023/0404511 A1 Dec. 21, 2023

(30) Foreign Application Priority Data
Jun. 16, 2022 (JP) ................... 2022-097261

(51) Int. Cl.
*A61B 6/10* (2006.01)
*A61B 6/03* (2006.01)

(52) U.S. Cl.
CPC ............. *A61B 6/107* (2013.01); *A61B 6/032* (2013.01)

(58) Field of Classification Search
CPC ...................................... A61B 6/107
See application file for complete search history.

(56) References Cited

U.S. PATENT DOCUMENTS 9,087,616 B2    7/2015  Murase et al.

FOREIGN PATENT DOCUMENTS

JP    2014-504176 A    2/2014

OTHER PUBLICATIONS

Kyriakou et al., DE 102014215448 B3 and its English translation (Year: 2014).*
Li et al., CN 111803116 A and its English translation (Year: 2020).*

* cited by examiner

*Primary Examiner* — Chih-Cheng Kao
(74) *Attorney, Agent, or Firm* — Paul Teng

(57) ABSTRACT

X-ray equipment that can protect an operator moving around in an imaging room from X rays. The X-ray equipment includes: an X-ray source that irradiates a subject with X rays; a detector that acquires projection data of the subject; and an image generator that generates an X-ray image of the subject using the projection data. The equipment further includes: a position calculating section that calculates the position of the operator in the imaging room; and a control section that moves a protective plate for shielding against X rays to between the X-ray source and the operator according to the position of the operator.

6 Claims, 8 Drawing Sheets

X-RAY EQUIPMENT

CLAIM OF PRIORITY

The present application claims priority from Japanese Patent Application JP 2022-097261 filed on Jun. 16, 2022, the content of which is hereby incorporated by reference into this application.

FIELD OF THE INVENTION

The present invention relates to X-ray equipment such as X-ray CT (Computed Tomography) equipment and more particularly to a technique for protecting an operator from X rays.

BACKGROUND

X-ray equipment such as X-ray CT equipment is equipment that irradiates a subject under examination with X rays to acquire projection data and generates an X-ray image of the subject using the projection data. The generated X-ray image is used as a medical image for image diagnosis of the subject or used when a medical procedure such as a puncture is performed on the subject. When a medical procedure is performed on the subject using the X-ray image, the operator who performs the procedure in an imaging room is exposed to X rays from the X-ray equipment.

Japanese Unexamined Patent Application Publication (Translation of PCT Application) No. 2014-504176 discloses a radiation protection device that has a concave portion in a flat plate of lead acrylic glass placed in front of the tunnel opening of the X-ray CT equipment, in which the concave portion has a sufficient size for a human arm to pass through and opens and closes. The operator passes his/her arm through the open concave portion to perform the procedure on the subject.

However, Japanese Unexamined Patent Application Publication (Translation of PCT Application) No. 2014-504176 gives no consideration to protection of the operator who is moving around in the imaging room, from X rays. The operator moves around not only to perform the procedure in front of the tunnel opening of the X-ray CT equipment but also to make preparations for the procedure and during the process, the operator may be exposed to X rays from the X-ray equipment.

Therefore, the object of the present invention is to provide X-ray equipment that can protect the operator moving around in the imaging room from X rays.

SUMMARY OF THE INVENTION

In order to achieve the above object, the present invention provides X-ray equipment that includes: an X-ray source that irradiates a subject with X rays; a detector that acquires projection data of the subject; and an image generator that generates an X-ray image of the subject using the projection data. The equipment further includes: a position calculating section that calculates the position of an operator in an imaging room; and a control section that moves a protective plate for shielding against X rays to between the X-ray source and the operator according to the position of the operator.

According to the present invention, X-ray equipment can protect the operator moving around in the imaging room from X rays.

DETAILED DESCRIPTION OF THE PREFERRED EMBODIMENTS

Hereinafter, an embodiment of X-ray equipment according to the present invention is described referring to the accompanying drawings. In the explanation given below and the accompanying drawings, the constituent elements with the same functional structure are designated by the same reference signs, so that repeated description thereof is omitted.

First Embodiment

Figure 1:
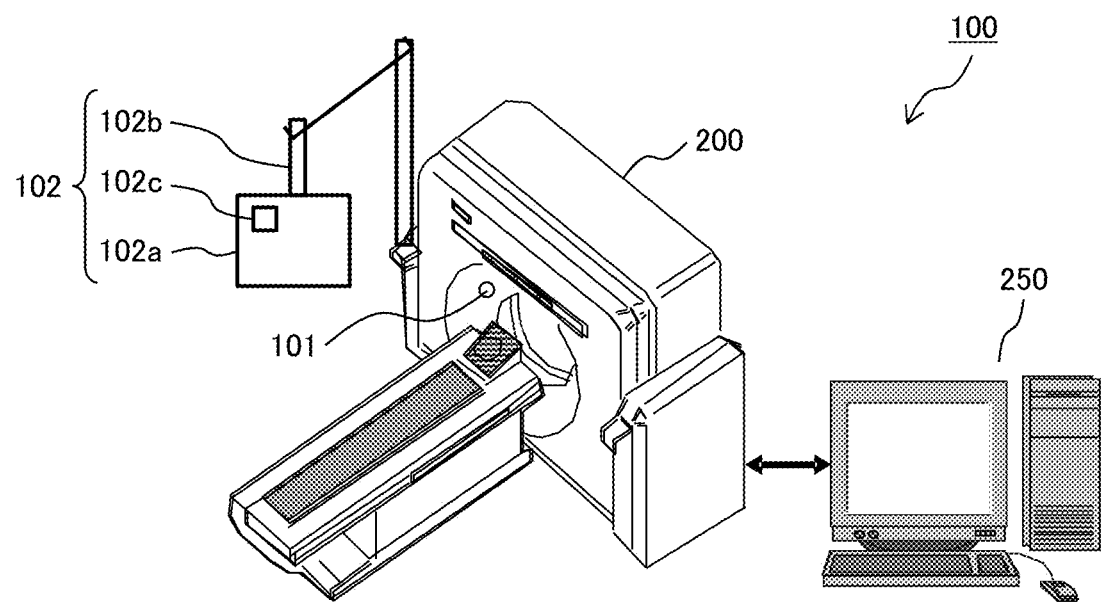
FIG. 1 is a view that shows the general configuration of X-ray CT equipment.

The general configuration of the X-ray CT equipment 100 as an example of X-ray equipment is explained below referring to FIG. 1. The X-ray CT equipment 100 includes a scanner 200, an operation unit 250, a camera 101, and a protective device 102.

Figure 2:
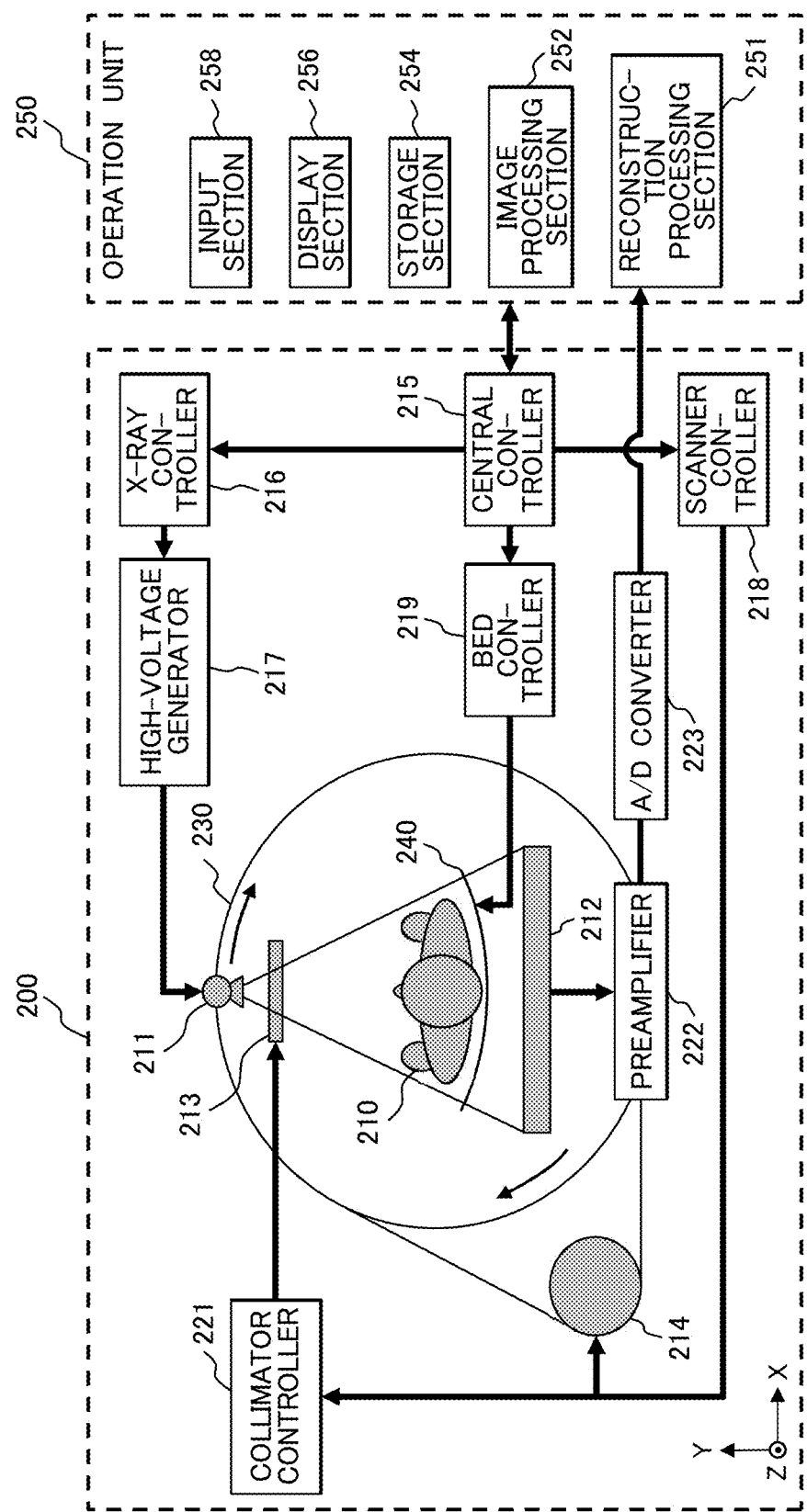
FIG. 2 is a diagram that explains a scanner and an operation unit.

The scanner 200 and operation unit 250 are explained below referring to FIG. 2. In FIG. 2, the X axis represents the horizontal direction, the Y axis represents the vertical direction and the Z axis represents the direction perpendicular to the plane of paper. The scanner 200 includes an X-ray tube 211, a detector 212, a collimator 213, a drive unit 214, a central controller 215, an X-ray controller 216, a high-voltage generator 217, a scanner controller 218, a bed controller 219, a collimator controller 221, a preamplifier 222, an A/D converter 223, a rotating plate 230, a bed 240 and so on.

The X-ray tube 211 is an X-ray source that irradiates the subject 210 lying on the bed 240 with X rays. When the high voltage that the high-voltage generator 217 generates according to a control signal sent from the X-ray controller 216 is applied to the X-ray tube 211, the subject is irradiated with X rays from the X-ray tube 211.

The collimator 213 is a device that limits the radiation range of X rays emitted from the X-ray tube 211. The radiation range of X rays is set according to a control signal sent from the collimator controller 221.

The detector 212 is a device that detects the X rays transmitted through the subject 210 to measure the spatial distribution of transmitted X rays. The detector 212 is installed in a manner to face the X-ray tube 211 and has many detecting elements arranged two-dimensionally in its surface facing the X-ray tube 211. The signal measured by the detector 212 is amplified by the preamplifier 222 before it is converted into a digital signal by the A/D converter 223. After that, various corrections are made on the digital signal to acquire projection data.

The drive unit 214 makes the X-ray tube 211 and the detector 212 rotate around the subject 210 by rotating the rotating plate 230 on which the X-ray tube 211 and the detector 212 are mounted, according to a control signal sent from the scanner controller 218. As the X-ray tube 211 and the detector 212 rotate, X rays are irradiated and detected so that projection data at a plurality of projection angles is acquired. A data collection unit at each projection angle is called a view. Regarding an array of detecting elements of the detector 212 that are arranged two-dimensionally, the rotation direction of the detector 212 is called a channel and the direction perpendicular to the channel is called a row. Projection data is identified by the view, channel, and row. In some cases, projection data is acquired with the rotating plate 230 inclined with respect to the plane perpendicular to the body axis of the subject 210.

The bed controller 219 controls the movement of the bed 240 and holds the bed 240 still or moves the bed 240 in the Z axis direction at a constant speed. A scan in which X rays are irradiated and detected while the bed 240 remains still is called an axial scan and a scan in which scanning is performed while the bed 240 is moving is called a spiral scan.

The central controller 215 is, for example, a CPU (Central Processing Unit), which controls the abovementioned operation of the scanner 200 according to an instruction from the operation unit 250. The central controller 215 may be provided in the operation unit 250.

Next, the operation unit 250 is explained. The operation unit 250 includes a reconstruction processing section 251, an image processing section 252, a storage section 254, a display section 256, an input section 258 and so on. The operation unit 250 is installed outside the imaging room.

The reconstruction processing section 251 is, for example, a CPU or GPU (Graphics Processing Unit), which reconstructs a tomographic image by back projection of the projection data acquired by the scanner 200. The image processing section 252 is, for example, a CPU or GPU, which performs various types of image processing in order to make the tomographic image suitable for diagnosis. The storage section 254 is, for example, an HDD (Hard Disk Drive) or SSD (Solid State Drive), which stores projection data, tomographic images and image-processed images. The display section 256 is, for example, a liquid crystal display or touch panel, which displays a tomographic image or an image-processed image. The input section 258 is, for example, a keyboard or pointing device and touch panel, which is used when the operator sets conditions to acquire projection data (tube voltage, tube current, scan speed, etc.) or conditions to reconstruct a tomographic image (reconstruction filter, FOV size, etc.).

The camera 101 is a device that takes an image of the inside of the imaging room in which the scanner 200 is installed, and is mounted on the scanner 200 or on the ceiling of the imaging room. Particularly, when the camera 101 takes an image of the operator moving around in the imaging room, it functions as a position acquiring section to acquire the position of the operator in the imaging room.

Figure 3A:
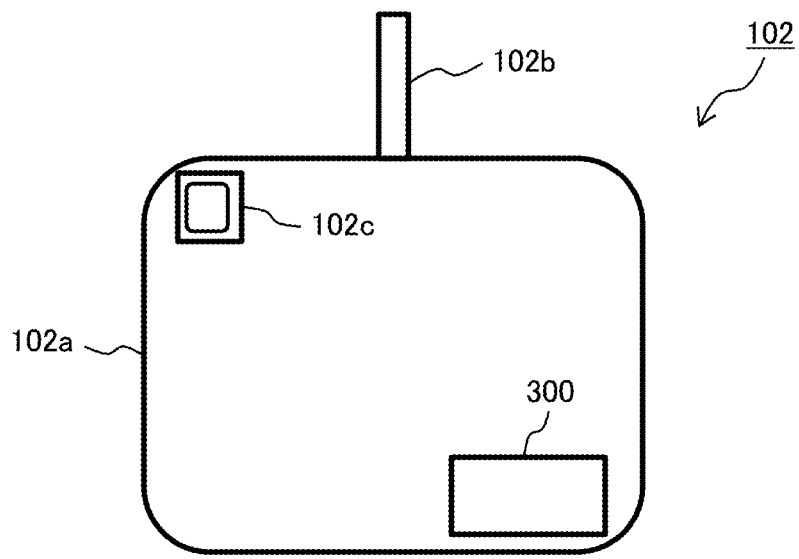
FIG. 3A is a view that shows an example of the structure of a protective device.

The protective device 102 is explained below referring to FIG. 3A. The protective device 102 includes a protective plate 102a for shielding against X rays and a multi-joint arm 102b. The protective plate 102a is, for example, a flat plate of about 50 square centimeters, made of lead acrylic glass. The multi-joint arm 102b is a bar member with a plurality of joints for connection, which is located between the protective plate 102a and the scanner 200. By bending several joints of the multi-joint arm 102b freely, the position and angle of the protective plate 102a are adjusted as desired. The protective plate 102a may be attached to, or detached from, the multi-joint arm 102b and may be replaced by a protective plate 102a suitable in shape and size for the procedure which the operator performs on the subject. In addition, the protective device 102 may have a distance sensor 102c that measures the distance between the protective plate 102a and the operator. Furthermore, the protective plate 102a may include an operation section 300.

Figure 3B:
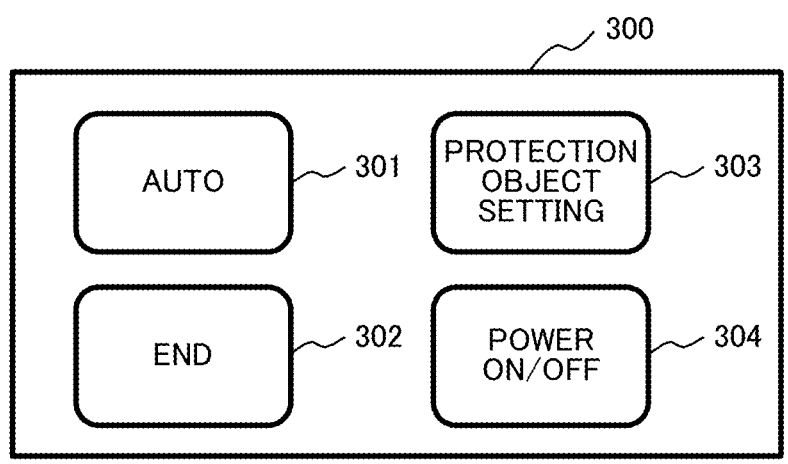
FIG. 3B is a view that shows an example of the operation section of the protective device.

An example of the operation section 300 is explained below referring to FIG. 3B. The operation section 300 includes an AUTO button 301, an END button 302, a protection object set button 303, and a POWER button 304. The AUTO button 301 is a button which is pressed to start the automatic control of the protective device 102. The END button 302 is a button which is pressed to end the automatic control of the protective device 102. The protection object set button 303 is a button which is pressed to set the object person to be protected from X rays. The POWER button 304 is a button which is pressed to turn on or off the protective device 102.

Figure 4:
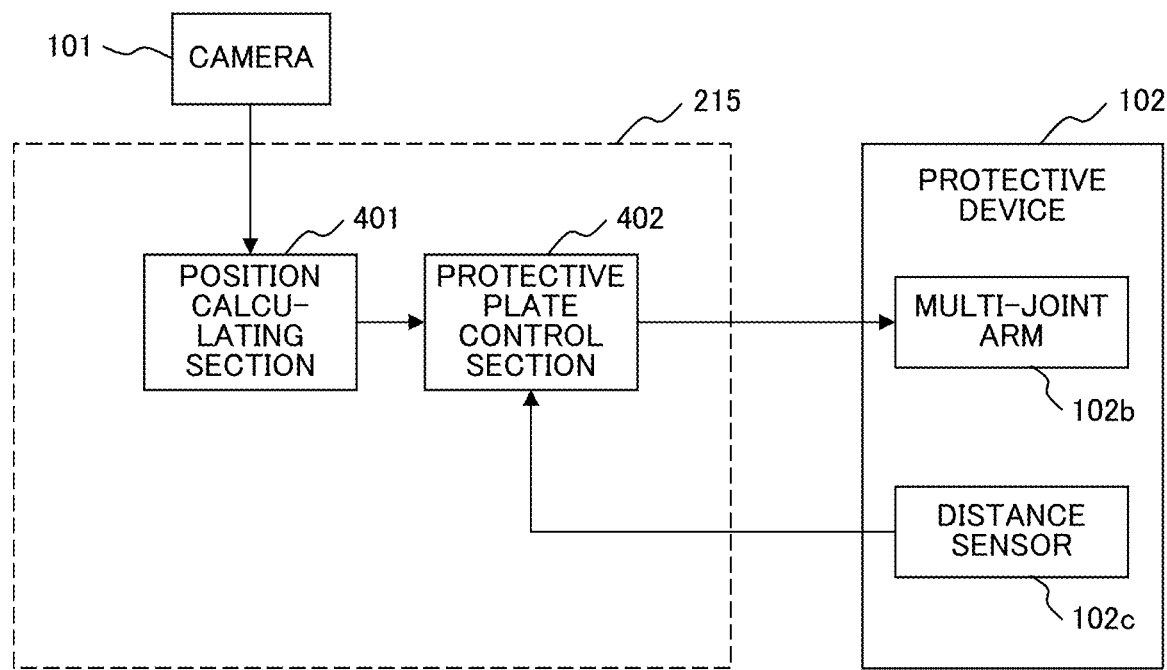
FIG. 4 is a functional block diagram according to the first embodiment.

The functional block diagram of FIG. 4 according to the first embodiment is explained below. Each of the functional blocks may be implemented by hardware or software which runs on a CPU such as the central controller 215. The explanation below is made on the assumption that the functional blocks in the first embodiment are implemented by software. The first embodiment includes a position calculating section 401 and a protective plate control section 402 as functional blocks. The functional blocks are described below.

The position calculating section 401 calculates the position of the operator in the imaging room and the position of the protective plate 102a on the basis of the image taken by the camera 101, as space coordinates.

The protective plate control section 402 controls the multi-joint arm 102b according to the positions of the operator and the protective plate 102a as calculated by the position calculating section 401, and moves the protective plate 102a to between the X-ray source and the operator. Alternatively, the protective plate control section 402 may control the multi-joint arm 102b according to the distance between the protective plate 102a and the operator as measured by the distance sensor 102c and adjust the position of the protective plate 102a. For example, the multi-joint arm 102b may be controlled so as to keep a specified distance between the protective plate 102a and the operator. When the specified distance is kept between the protective plate 102a and the operator, the operator can perform a procedure on the subject smoothly.

Figure 5:
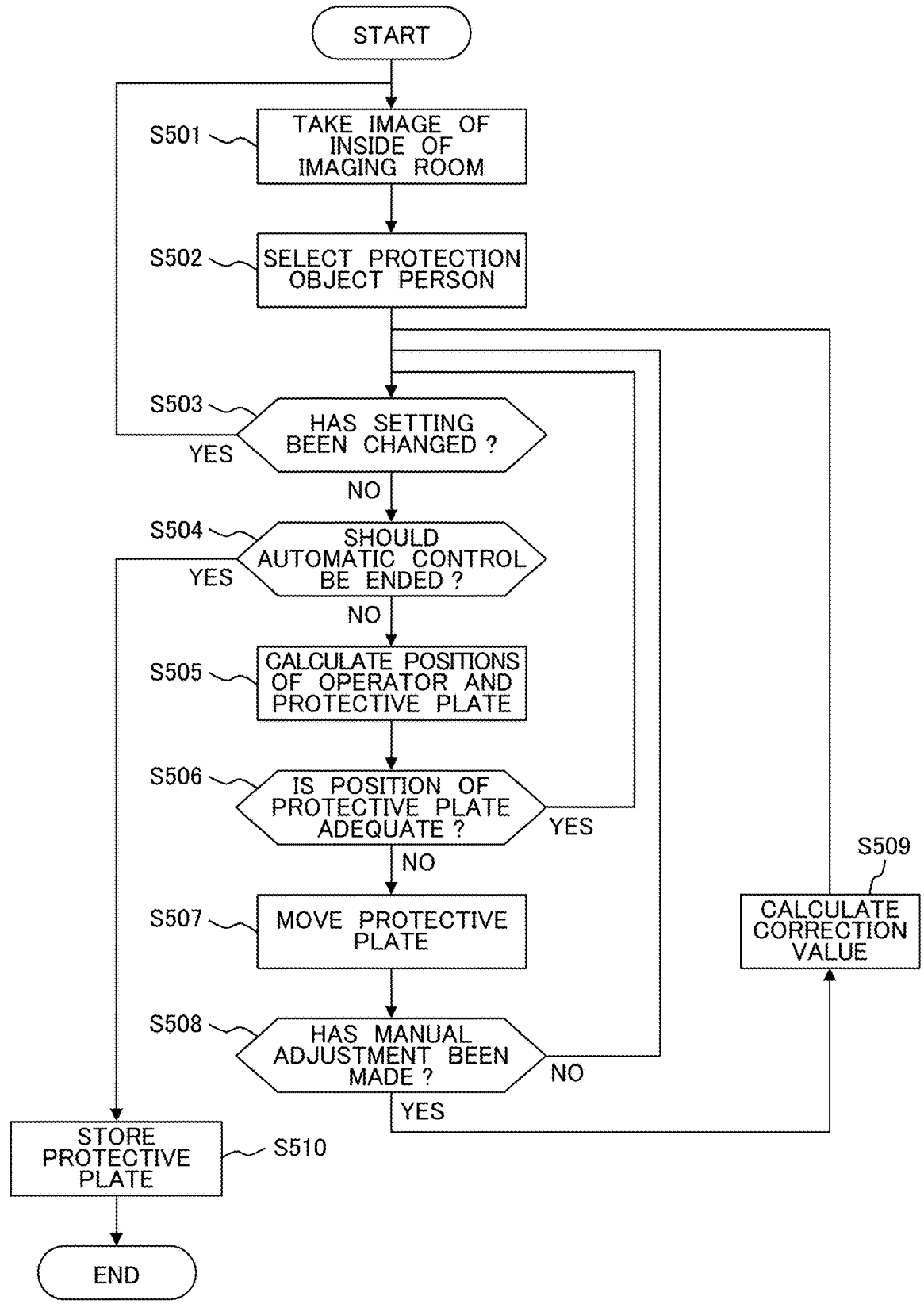
FIG. 5 is a flowchart that shows the processing sequence according to the first embodiment.

Next, an example of the processing sequence that is performed according to the first embodiment is explained referring to FIG. 5.

(S501)

When the protective device 102 is turned on, the camera 101 takes an image of the inside of the imaging room. The image taken by the camera 101 is displayed, for example, on the display section 256 of the operation unit 250. The protective device 102 is turned on by pressing the POWER button 304 of the operation section 300. When the protective device 102 is turned on, the protective plate 102a may be moved to the position where the operator can work easily, for example, near the bed 240 in front of the scanner 200. When the power to the protective device 102 is off, the protective plate 102a is stored in the vicinity of the scanner 200 out of the way of the operator.

(S502)

The operator selects the protection object person as the object to be protected from X rays. After the protection object person is selected, for example, if the AUTO button is pressed, the automatic control of the protective device 102 is started and the processing sequence proceeds to S503.

Figure 6A:
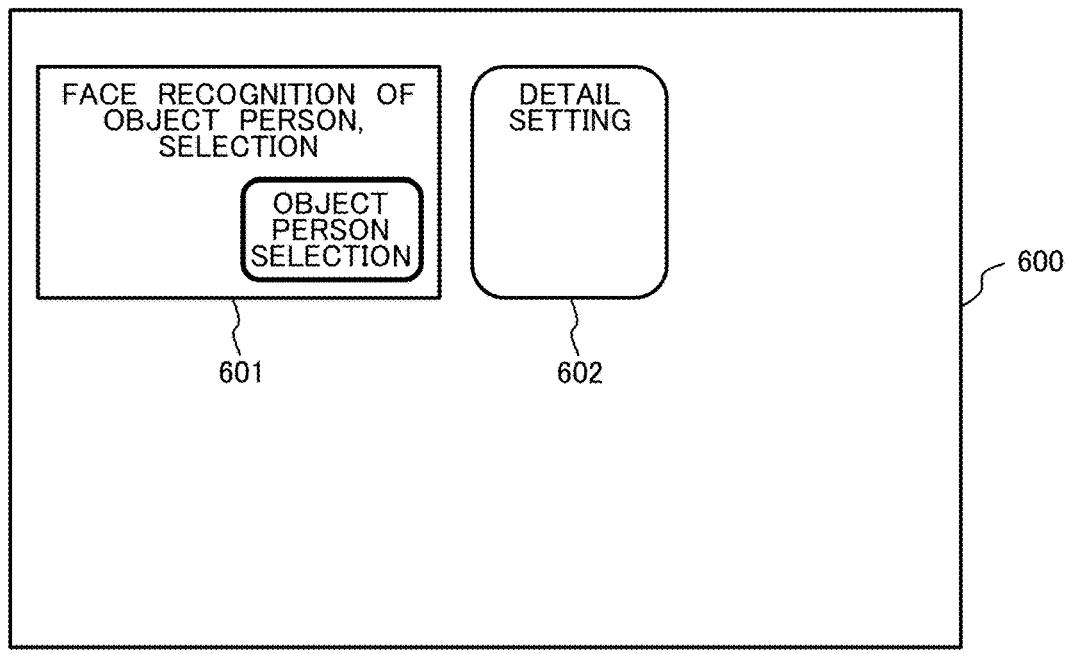
FIG. 6A is a view that illustrates an example of a screen shown on a display section.

The protection object person may be selected on a protection object setting part 601 of the screen 600 illustrated in FIG. 6A. The screen 600 is displayed, for example, on the display section 256 of the operation unit 250. On the protection object setting part 601, a person extracted by facial recognition among the images taken by the camera 101 is shown as a candidate for the protection object person. The operator selects, among the extracted candidates, the protection object person, for example, the operator who is to perform the procedure on the subject. The screen 600 may include a detail setting part 602.

Figure 6B:
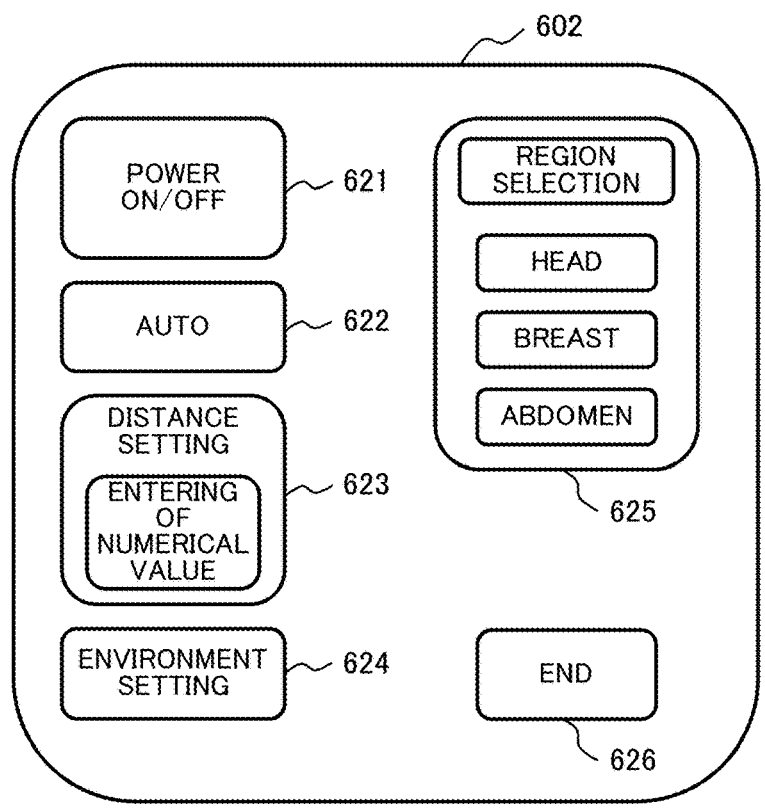
FIG. 6B is a view that illustrates an example of a detail setting part.

An example of the detail setting part 602 is explained below referring to FIG. 6B. The detail setting part 602 includes a POWER button 621, an AUTO button 622, a distance setting part 623, an environment set button 624, a region selecting part 625, and an END button 626.

The POWER button 621 is a button which is pressed to turn on or off the protective device 102. The AUTO button 622 is a button which is pressed to start the automatic control of the protective device 102. The distance setting part 623 is used to enter a numerical value as the distance between the protective plate 102a and the protection object person. The environment set button 624 is pressed to display the environment setting screen 700 illustrated in FIG. 7. The region selecting part 625 is used to select the region to be protected from X rays. The candidates for the region to be selected by the region selecting part 625 are not limited to the head, breast, and abdomen shown in FIG. 6B. The END button 626 is a button which is pressed to end the automatic control of the protective device 102.

Figure 7:
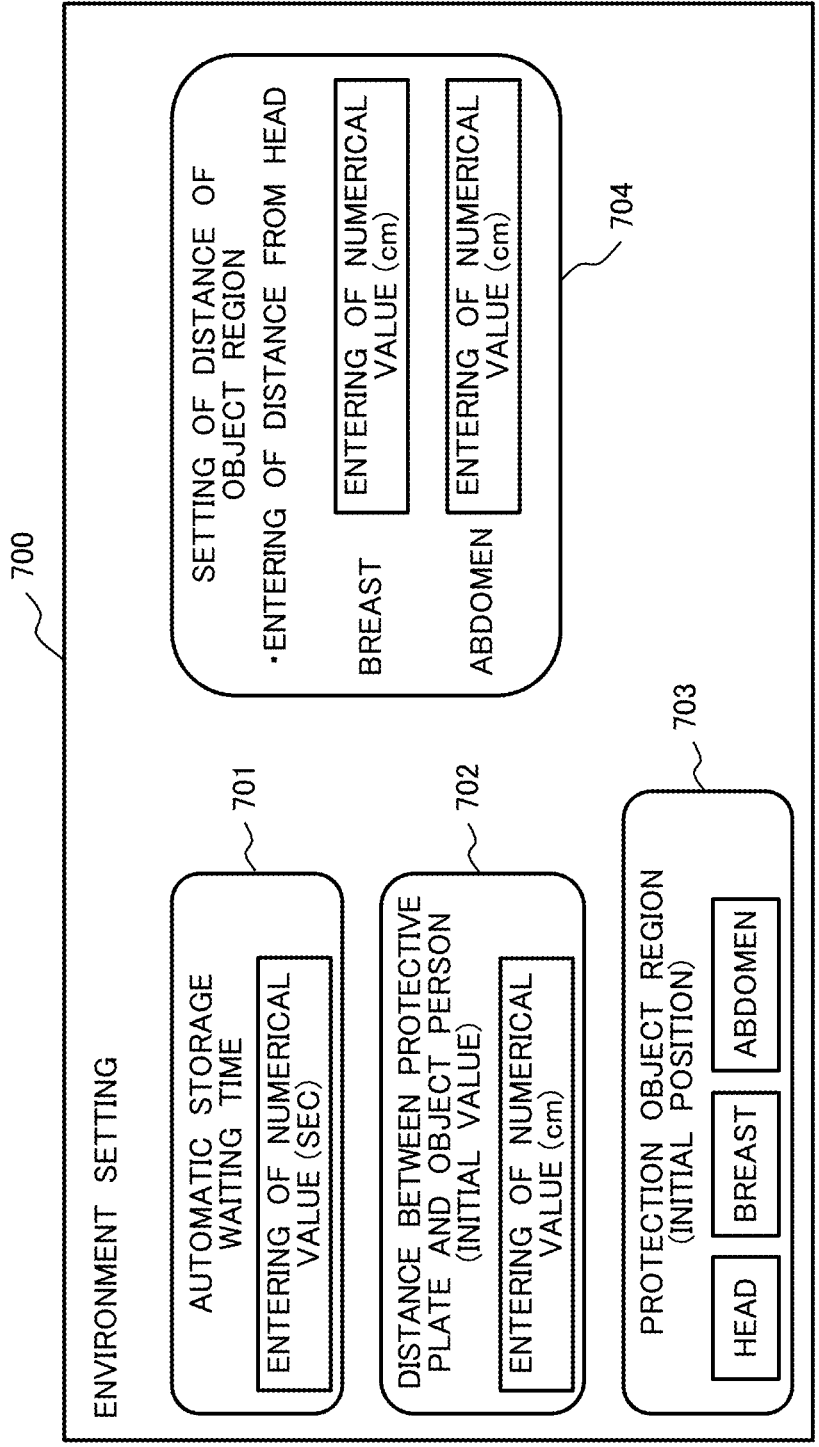
FIG. 7 is a view that illustrates an example of an environment setting screen.

An example of the environment setting screen 700 is explained below referring to FIG. 7. The environment setting screen 700 includes a waiting time setting part 701, an initial distance setting part 702, a region setting part 703, and an inter-region distance setting part 704.

The waiting time setting part 701 is used to set the waiting time for the protective plate 102a to be stored automatically. In other words, if the position calculating section 401 cannot calculate the position of the operator and the waiting time elapses, the protective plate 102a is automatically stored in the vicinity of the scanner 200.

The initial distance setting part 702 is used to set an initial value for the distance between the protective plate 102a and the protection object person. In other words, if a numerical value is not entered on the distance setting part 623, the initial value set on the initial distance setting part 702 is used for the distance between the protective plate 102a and the protection object person.

The region setting part 703 is used to set the initial position of the region to be protected. In other words, if a region is not selected on the region selecting part 625, the region selected on the region setting part 703 is selected as the protection object region.

The inter-region distance setting part 704 is used to set the distance, for example, from the head to the breast or abdomen. In the images taken by the camera 101, there are cases that the breast and abdomen are more difficult to extract than the head. For this reason, instead of extracting the breast or abdomen from the image, the position of the breast or abdomen is calculated on the basis of the head extracted from the image and the distance set on the inter-region distance setting part 704.

Refer back to FIG. 5 for the explanation of the processing sequence.

(S503)

The central controller 215 decides whether the setting for the protection object person has been changed or not. If the setting has been changed, the sequence goes back to S501 and if not, the sequence goes to S504. Whether the setting has been changed or not is decided, for example, according to whether the protection object set button 303 has been pressed or not.

(S504)

The central controller 215 decides whether or not to end the automatic control of the protective device 102. If the automatic control is to be ended, the sequence goes to S510 and if it should not be ended, the sequence goes to S505. Whether or not to end the automatic control is decided, for example, according to whether the END button 302 has been pressed or not. In addition, if an impact caused, for example, by an accidental contact of the protective plate 102a with the operator is detected, the automatic control may also be ended.

(S505)

The camera 101 takes an image of the inside of the imaging room and the position calculating section 401 calculates the position of the operator and the position of the protective plate 102a on the basis of the image taken by the camera 101.

(S506)

The protective plate control section 402 decides whether the position of the protective plate 102a is adequate or not. If the position of the protective plate 102a is adequate, the sequence goes back to S503. If it is not adequate, the sequence goes to S507. Whether the position of the protective plate 102a is adequate or not is decided according to whether the protective plate 102a is positioned between the X-ray source and the protection object person or not. Specifically, if the protective plate 102a is positioned between the X-ray source and the protection object person, the position of the protective plate 102a is decided to be adequate. If the region to be protected from X rays is selected on the region selecting part 625, whether the protective plate 102a is positioned between the region concerned of the protection object person and the X-ray source or not is decided.

If the protective device 102 has a distance sensor 102c, the difference between the distance set on the distance setting part 623 and the distance measured by the distance sensor 102c is further utilized to decide whether the position of the protective plate 102a is adequate or not. In other words, even when the protective plate 102a is positioned between the X-ray source and the protection object person, if the difference between the set distance value and the measured distance value is larger than a predetermined threshold, the position of the protective plate 102a is decided to be not adequate.

(S507)

The protective plate control section 402 controls the multi-joint arm 102b and moves the protective plate 102a to between the X-ray source and the protection object person. If the protective device 102 has the distance sensor 102c, the multi-joint arm 102b is controlled so as to keep a specified distance between the protective plate 102a and the protection object person. In addition, in order to prevent the protective plate 102*a* from being in contact with the scanner 200, the position of the scanner 200 may be previously registered as a movement prohibition area for the protective plate 102*a*.

(S508)

The protective plate control section 402 decides whether the position of the protective plate 102*a* has been manually adjusted by the operator or not. If it has been manually adjusted, the sequence goes to S509 and if it has not been manually adjusted, the sequence goes back to S503. Whether the protective plate 102*a* has been manually adjusted or not is decided, for example, according to whether an external force has been exerted on the multi-joint arm 102*b* or not. Here, S508 and S509 are not always required and the sequence may go back to S503 after the execution of S507.

(S509)

The protective plate control section 402 calculates a correction value on the basis of the manually adjusted position of the protective plate 102*a*. The calculated correction value is used at S506 and S507. This means that the relative positional relation between the protective plate 102*a* manually adjusted by the operator and the operator is maintained during the subsequent processing steps. Since the operator manually adjusts the position of the protective plate 102*a* so that he/she can perform the procedure easily, the relative positional relation is maintained during the subsequent processing steps, and the operator can perform the procedure on the subject smoothly. The correction value may include the angle between the line connecting the operator and the X-ray source and the protective plate 102*a*.

(S510)

The protective plate control section 402 controls the multi-joint arm 102*b* and stores the protective plate 102*a* in the vicinity of the scanner 200.

With the flow of processing steps explained above, according to the image taken by the camera 101, the protective plate 102*a* is controlled so that it is positioned between the X-ray source and the operator and thus the operator who moves around in the imaging room can be protected from X rays. Furthermore, since a specified distance is kept between the operator and the protective plate 102*a*, the operator can perform the procedure on the subject smoothly. The X-ray CT equipment 100 may include a plurality of protective devices.

X-ray CT equipment 100 with a plurality of protective devices is explained below referring to FIG. 8. The X-ray CT equipment 100 illustrated in FIG. 8 includes another protective device 802 in addition to the protective device 102. Like the protective device 102, the protective device 802 includes: a protective plate 802*a* for shielding against X rays; and a multi-joint arm 802*b*. While the multi-joint arm 102*b* is installed between the protective plate 102*a* and the scanner 200, the multi-joint arm 802*b* is installed between the protective plate 802*a* and the ceiling 800 of the imaging room. The scanner 200 includes a scanner monitor 801. The scanner monitor 801 may display the screen 600.

Figure 8:
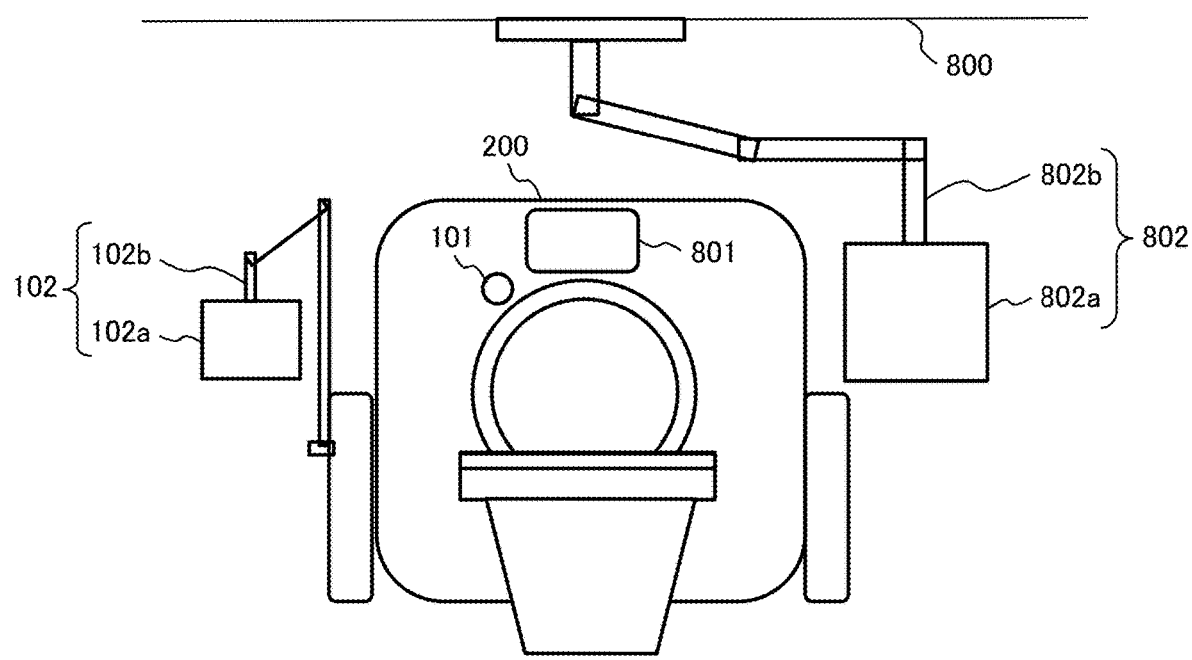
FIG. 8 is a diagram that illustrates an example of X-ray CT equipment with a plurality of protective devices.

In the X-ray CT equipment 100 illustrated in FIG. 8, the protection object person is selected for each of the protective device 102 and the protective device 802 at S502. Each of the protective plate 102*a* and protective plate 802*a* is controlled so that it is positioned between the protection object person selected for it at S502 and the X-ray source, so a plurality of protection object persons can be protected from X rays.

The X-ray equipment according to an embodiment of the present invention has been so far described. The present invention is not limited to the above embodiment, but the constituent elements can be embodied in modified forms without departing from the gist of the invention. Some of the constituent elements disclosed in the above embodiment may be combined as appropriate. Furthermore, among all the constituent elements described in the above embodiment, some constituent elements may be omitted.

REFERENCE SIGNS LIST

100: X-ray CT equipment
101: camera
102: protective device
102*a*: protective plate
102*b*: multi-joint arm
102*c*: distance sensor
200: scanner
210: subject
211: X-ray tube
212: detector
213: collimator
214: drive unit
215: central controller
216: X-ray controller
217: high-voltage generator
218: scanner controller
219: bed controller
221: collimator controller
222: preamplifier
223: A/D converter
230: rotating plate
240: bed
250: operation unit
251: reconstruction processing section
252: image processing section
254: storage section
256: display section
258: input section
300: operation section
301: AUTO button
302: END button
303: protection object set button
304: POWER button
401: position calculating section
402: protective plate control section
600: screen
601: protection object setting part
602: detail setting part
621: POWER button
622: AUTO button
623: distance setting part
624: environment setting button
625: region selecting part
626: END button
700: environment setting screen
701: waiting time setting part
702: initial distance setting part
703: region setting part
704: inter-region distance setting part
800: ceiling
801: scanner monitor
802: protective device
802*a*: protective plate
802*b*: multi-joint arm

What is claimed is:

1. X-ray equipment comprising:
an X-ray source that irradiates a subject with X rays;
a detector that acquires projection data of the subject; and
an image generator that generates an X-ray image of the subject using the projection data, the equipment further comprising:
a position calculating section that calculates a position of an operator in an imaging room; and
a control section that moves a protective plate for shielding against the X rays to between the X-ray source and the operator, wherein
while the subject is irradiated with the X rays from the X-ray source, (a) the position calculating section calculates a position of the protective plate and calculates the position of the operator, and (b) the control section performs automatic control repeatedly to maintain a specified distance between the protective plate and the operator, based on the positions of the protective plate and the operator.

2. The X-ray equipment according to claim 1, further comprising:
a distance sensor that measures a distance between the operator and the protective plate,
wherein the control section controls the position of the protective plate according to the distance measured by the distance sensor so that the distance from the operator is within a predetermined range.

3. The X-ray equipment according to claim 1, wherein the control section calculates a correction value according to the position of the protective plate that has been manually moved and controls the position of the protective plate using the correction value.

4. The X-ray equipment according to claim 1, wherein the control section controls the position of the protective plate so as to protect a protection region as a previously specified region, from X rays.

5. The X-ray equipment according to claim 4, wherein the control section calculates a position of the protection region from a distance from a head of the subject.

6. X-ray equipment comprising:
an image generator that generates an X-ray image of a subject using projection data acquired from the subject upon irradiation with X rays from an X-ray source;
a position calculating section that calculates a position of an operator in an imaging room; and
a control section that moves a protective plate for shielding against the X rays to between the X-ray source and the operator, wherein while the subject is irradiated with the X rays from the X-ray source, (a) the position calculating section calculates a position of the protective plate and calculates the position of the operator, and (b) the control section performs automatic control repeatedly to maintain a specified distance between the protective plate and the operator, based on the positions of the protective plate and the operator.

* * * * *